(12) United States Patent
Mercs

(10) Patent No.: US 12,138,704 B2
(45) Date of Patent: Nov. 12, 2024

(54) METHOD FOR ATTACHING PARTS BY SPRAYING A POWDER OF A DUCTILE MATERIAL; CORRESPONDING ASSEMBLY

(71) Applicant: LISI AUTOMOTIVE, Grandvillars (FR)

(72) Inventor: David Mercs, Belfort (FR)

(73) Assignee: LISI Automotive, Grandvillars (FR)

( * ) Notice: Subject to any disclaimer, the term of this patent is extended or adjusted under 35 U.S.C. 154(b) by 225 days.

(21) Appl. No.: 17/621,779

(22) PCT Filed: Jun. 25, 2020

(86) PCT No.: PCT/FR2020/000195
§ 371 (c)(1),
(2) Date: Dec. 22, 2021

(87) PCT Pub. No.: WO2020/260778
PCT Pub. Date: Dec. 30, 2020

(65) Prior Publication Data
US 2022/0241882 A1    Aug. 4, 2022

(30) Foreign Application Priority Data

Jun. 25, 2019 (FR) .................................... 19 06 888
Apr. 9, 2020 (FR) .................................... 20 03 560

(51) Int. Cl.
*B23K 1/00* (2006.01)
*B23K 1/005* (2006.01)
(Continued)

(52) U.S. Cl.
CPC ........ *B23K 1/0056* (2013.01); *B23K 26/3584* (2018.08); *C23C 24/04* (2013.01); *B23K 2101/006* (2018.08); *B23K 2103/20* (2018.08)

(58) Field of Classification Search
CPC .............. B23K 1/0056; B23K 26/3584; B23K 2101/006; B23K 2103/20; B23K 2101/18;
(Continued)

(56) References Cited

U.S. PATENT DOCUMENTS 8,709,335 B1 * 4/2014 Vlcek ................... B05B 7/1626
427/191
10,501,827 B2 * 12/2019 Champagne, Jr ...... B23K 35/36
(Continued)

FOREIGN PATENT DOCUMENTS

| CN | 101760748 A | * | 6/2010 | ............. C23C 24/04 |
| CN | 104040649 A | * | 9/2014 | ............. C22C 38/00 |

(Continued)

OTHER PUBLICATIONS

International Search Report for corresponding application PCT/FR2020/000195 filed Jun. 25, 2020; Mail date Nov. 3, 2020.

*Primary Examiner* — Kiley S Stoner
(74) *Attorney, Agent, or Firm* — Sunstein LLP

(57) ABSTRACT

The present application describes a method for attaching a first part (20) and a second part (30) for mechanical assembly to each other, the method comprising spraying a powder (10) of a ductile material onto the parts (20, 30), causing the parts (20, 30) to become attached to one another by agglomeration of this powder (10), the method comprising texturing at least one surface of one of the two parts (20, 30) onto which the spraying is subsequently carried out.

19 Claims, 13 Drawing Sheets

(51) Int. Cl.
*B23K 26/352* (2014.01)
*C23C 24/00* (2006.01)
*C23C 24/04* (2006.01)
*B23K 101/00* (2006.01)
*B23K 103/20* (2006.01)

(58) Field of Classification Search
CPC ............ B23K 26/0622; B23K 26/0006; C23C 24/04; Y02P 10/25
See application file for complete search history.

(56) References Cited

U.S. PATENT DOCUMENTS

| | | | |
|---|---|---|---|
| 10,702,939 B2 * | 7/2020 | Binek | .................. C23C 24/106 |
| 2005/0123686 A1 * | 6/2005 | Myrick | .................. C23C 14/16 427/446 |
| 2007/0194085 A1 | 8/2007 | Spinella | |
| 2007/0241164 A1 | 10/2007 | Barnes | |
| 2014/0263853 A1 * | 9/2014 | Jackson | ............... B32B 15/011 428/553 |
| 2015/0240364 A1 | 8/2015 | Reiche | |
| 2019/0036429 A1 * | 1/2019 | Wang | ........................ C23C 4/12 |
| 2020/0109645 A1 * | 4/2020 | Nesteroff | ............... F23R 3/002 |

FOREIGN PATENT DOCUMENTS

| | | | | | |
|---|---|---|---|---|---|
| CN | 107151772 A | * | 9/2017 | ............... | C23C 4/02 |
| CN | 109112460 A | * | 1/2019 | ............... | C23C 4/06 |
| CN | 109321859 A | * | 2/2019 | | |
| CN | 109338354 A | * | 2/2019 | ........... | C23C 24/085 |
| CN | 110468364 A | * | 11/2019 | ............... | C23C 4/02 |
| CN | 110643990 A | * | 1/2020 | | |
| CN | 109267064 B | * | 4/2020 | ............... | C23C 24/04 |
| CN | 110983277 A | * | 4/2020 | | |
| CN | 111118460 A | * | 5/2020 | ........... | B22F 1/0011 |
| DE | 3840514 A1 | * | 6/1990 | | |
| DE | 102007023418 A1 | | 11/2008 | | |
| DE | 102016218488 A1 | * | 3/2018 | | |
| EP | 3338920 A1 | * | 6/2018 | ............... | B22F 3/02 |
| JP | 4477229 B2 | * | 6/2010 | ....... | B32B 17/10036 |
| JP | 2010162602 A | * | 7/2010 | ............... | C23C 24/04 |
| KR | 102049192 B1 | * | 11/2019 | | |
| TW | I558488 B | * | 11/2016 | | |
| WO | WO-2006040746 A2 | * | 4/2006 | ............... | B23P 9/02 |
| WO | WO-2014048790 A3 | * | 5/2014 | ........... | B23K 26/355 |
| WO | WO-2015041844 A1 | * | 3/2015 | ......... | B29C 37/0014 |
| WO | WO-2020044864 A1 | * | 3/2020 | ............... | C23C 4/10 |

* cited by examiner

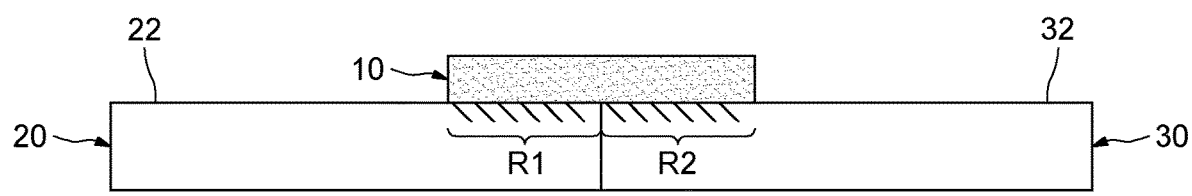
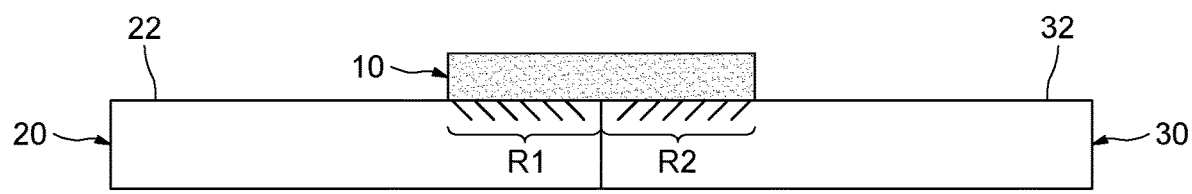

METHOD FOR ATTACHING PARTS BY SPRAYING A POWDER OF A DUCTILE MATERIAL; CORRESPONDING ASSEMBLY

BACKGROUND

In a context in which reducing the weight of vehicles is a major desideratum in order to reduce polluting emissions, assembling materials of different natures is becoming more and more important and is present in a growing proportion of assemblies in land or air vehicles. Examples include assemblies of steel and aluminium alloy, or between steel and polymer or composite materials, using carbon fibres, for which conventional assembly techniques cannot be used.

There are solutions, such as bonding, clinching, riveting, or self-tapping screws, but these are limited by the types of materials being assembled (e.g., it is impossible to clinch a composite with carbon fibres), lack mechanical strength, or require the presence of pointed ends that are potentially dangerous in certain areas of the vehicle.

a. Welding Pins

Recently, to meet this new need for multi-material assemblies, several manufacturers have proposed welding pins that allow for assemblies of two different materials that cannot be directly resistance-welded together.

The obvious advantage of welding pins is the use of resistance welding means that are widely used in the assembly chains of various auto or aircraft manufactures, allowing for easy transfer of this technology. However, welding pins have non-negligible disadvantages that limit their widespread use, particularly (without limitation):

- The limitation that the assembly must have at least one through-hole for the welding pin,
- the limitation that the assembly must have at least one primarily iron-based (steel) part in order to carry out resistance welding,
- the limitation that the material of the pin must be primarily iron-based (steel) part in order to carry out resistance welding,
- the need for access to both sides of the assembly in order to make resistance welding possible,
- the need to adapt the geometry of the welding pin based on the geometry of the assembly and the difference in thickness between the two pieces being assembled, or the thickness tolerance of the two pieces being assembled, thus increasing the number of requirements that must be met by the pins in order to meet the needs of all situations,
- the limitation to plane-on-plane assemblies,
- the generation of excess thickness in the location of the pin in order to ensure secure mechanical bonding,
- thermal degradation of the polymer or composite part when resistance-welding the pin to the other part that is mostly iron-based (steel).

Moreover, given the number of multi-material assembly points, which may range from 500 to more than 1500 depending on vehicle type, the weight associated with the welding pin technique is not negligible, and thus counterproductive to the initial objective of reducing vehicle weight.

Indeed, welding pins are made mostly of iron, having a density of approximately 7.8 g/cm3. For a standard 4.5 g welding pin, the increase in mass may range from 2.25 to more than 6.75 kg. Depending on the number of assembly points, the welding pin approach may not be suitable unless the reduction in mass due to the composite nature of the assembly is non-negligible (case-by-case study).

Another important aspect is the mechanical strength of the multi-material assembly produced using the welding pins. This depends essentially on the quality of the weld between the welded part of the pin and the majority-iron part (heat affected zones).

In order to lighten vehicles, auto makers generally use high- or ultra-high-strength steels (greater than 600, 800, or even 1500 MPa) in order to reduce the thickness of flat steel products generally used in the body, in order to reduce their mass whilst maintaining the level of mechanical strength required for structural parts such as crossbars or floor reinforcements or door impact beams, as seen in FIG. 1. Moreover, aluminium alloys are used more and more in vehicles, with the attendant issues associated with assembling them to steel. Lastly, certain vehicles also use carbon-fibre or thermoplastic composite materials, which are a real challenge to bond mechanically with steel or aluminium alloys.

Such cases require, for example, a low-alloy steel pin (low material cost) on a steel sheet with very high mechanical strength, thus generally reducing the strength of the weld. Additionally, because welding is not optimised and does not offer much variety in terms of the type of steel used, the shearing resistance and fatigue resistance in the event of alternating flexural stresses are not optimised.

b. Cold Spray Thermal Spraying

Since the 1980s, a method known as 'cold spraying' allows for coatings to be produced using non-melted metal powder particles that are sprayed at very high speed (several hundred metres per second) onto the part being coated. This method, which is particularly suited for depositing ductile metallic materials, allows for the formation and cohesion of a coating due to the plastic deformation of the particles and the substrate upon contact with the substrate in the first moments of the growth of the coating, and upon contact with the coating being formed.

Taking into account the spraying ductile, non-melted materials, cold spraying allows for metallic coatings to be deposited in ambient air with very little or no oxide formation. Cold spraying also allows for much lower thermal stresses to the substrate than classic thermal spraying methods (plasma, HVOF, etc.) and limits the accumulation of thermal stresses in the spray deposit.

Additionally, the speed and performance of cold spraying are generally quite high (in the kg/h range with yields greater than 90%), making the technique particularly worthwhile for industrial applications.

PRIOR ART

Given its advantages, the use of cold spraying for assemblies of two materials has been proposed. The document below describes such use.

Document US 2007/0194085 A1 describes producing an assembly of two parts, which may be of different materials, forming a bump by cold spraying a metal such as aluminium and keeping the parts attached to one another.

This document describes the importance of spraying at a speed that produces sufficient energy to remove any contaminants present on the metal being sprayed and at least on the interface between the parts being assembled so as to clean the connecting surfaces. The contaminants removed are, e.g., oxides, lubricants, adhesives, or coatings.

This document contrasts its assembly method with welding two parts, which reduces the mechanical strength of the assembly.

This document also states that the speed at which the metal is sprayed is sufficient to connect the parts being assembled without reaching their melting point, thus creating a connection without a heat-affected zone in which the mechanical and corrosion properties of the metals are considerably reduced.

However, in the assembly described in this document, the adherence of the cold-sprayed metal is essentially mechanical due to the plastic deformation of the substrate upon impact with the first particles sprayed, thus creating attachment points at the substrate/particle interface.

Additionally, the particles sprayed are ductile, and the difference in mechanical strength between the particles sprayed and the substrate initially influences the attachment of the cold-sprayed metal.

In fact, the normal additive manufacturing conditions for cold spraying generally allow for a good mechanical bond between a sprayed material that is of the same nature as the substrate on which it is deposited, e.g. metal on metal. Moreover, the substrate must have sufficient ductility to deform plastically upon impact with the incoming sprayed particles in order to create attachment points.

Thus, for example, producing an aluminium alloy bump having a mechanical strength (Rm) of app. 250-400 MPa with a good mechanical connection by cold spraying on another, stronger or harder material such as steel (Rm>600-800 MPa), or a carbon-fibre composite material (Rm>1000 MPa) is quite difficult, because the plastic deformation of steel or carbon upon contact with the aluminium alloy particles is near nil.

Moreover, document US 2007/0194085 A1 indicates that the bonding material secures two parts once an adhesive arranged between the two parts has set. This document further indicates that the assembly technology described has low strength.

SUMMARY

The objective is to address the disadvantages of the prior art with flexible implementation and at least equivalent mechanical shearing resistance.

The invention proposes the production of a bump by additive manufacturing in order to mechanically assemble two parts whilst limiting the increase in mass of the assembly so as to propose a solution appropriate for multi-material assemblies in order to reduce the weight of land and air vehicles.

Also proposed is a purely mechanical attachment solution that does not necessarily require the prior formation of through-holes in one of the two elements being assembled or access to both sides of the assembly, which is an advantage, for example, for assemblies on automotive or aeronautic assembly lines.

The invention proposes cold spraying a bump having a density, e.g., less than or equal to 5.1 g/cm3 on a support surface having a mechanical strength that is greater than that of the bump. For example, the support surface is metal, polymer, and/or composite. The bump serves as an attachment point for assembly with a second material which may, e.g., be metal, polymer, and/or composite.

Lastly, because the attachment bump is produced by in-situ additive manufacturing, the geometry of the bump is adapted to the geometry of the pieces being assembled, and variations in thickness do not constitute an impediment. Likewise, the assembly between two parts is no longer limited to a plane-on-plane assembly. In-situ additive manufacturing of the bump is highly flexible, and the bump adapts to the environment in which the assembly of the two parts is to be produced within the limits of accessibility of the assembly area by a robotic arm.

The invention proposes a support surface prepared in advance by the impact of a laser beam (local melting and sublimation of the material) with a certain energy and frequency so as to generate a micrometric network R of holes having a diameter D and a depth P, or lines having a width D, a length Lt, and a depth P, and, in one embodiment, having a P/D ratio greater than 1.

In the specific case of the network of lines, a continuous succession of lines may, for example, form a network of line shaving a length $n.L_t$, ($n \in \mathbb{R}$) that are parallel or intersecting, with no limitation as to the specific pattern.

The network R of holes or lines in the support surface allows for the formation of a network R of micrometric protrusions on the support surface of the bump with the support upon additive manufacturing of the bump. The protrusions of the bump constitute primary anchors to the support surface. The bump thus formed on the support surface has optimised resistance to shearing forces substantially perpendicular to the direction of growth of the bump by additive manufacturing, and may be used as an assembly point between different materials, where the surface of the materials is previously and locally textured by laser.

The disadvantage of the difference in mechanical strength between the sprayed material (soft) and the support material (hard) or of an equivalent mechanical strength, as is generally found in thermal spraying, surprisingly becomes an advantage in the context of the proposed solution. Indeed, the greater or equivalent mechanical strength of the support favours the filling of the network R of holes or lines in the support by a softer/more ductile sprayed material or a sprayed material having equivalent strength where the particles sprayed have a diameter on the same order of magnitude as the holes or lines obtained by laser texturing on the support. The accumulation by spraying in the holes or lines of the support with very high spraying energies (particle speed greater than 500 m/s) generates compression forces perpendicular to the walls of the holes or lines in the support, thus, reinforcing the mechanical attachment of the bump according to the invention.

Also proposed is a three-dimensional metal bump having a low density, obtained by additive manufacturing on a support, with optimised shearing strength, which may be the major constituent of an assembly between two materials of different natures or two materials of the same nature that cannot be resistance-welded together.

Given its very localised production on the surface of a support part, and taking into account that the thickness of the bump is on the same order of magnitude as its contact surface with the support part, the plot according to the invention is not a surface coating, but a 3-dimensional metal part obtained by additive manufacturing, with the particular characteristic that it has a network R of protrusions (filling the holes or lines of the support), which serves as an anchor on the support part.

Another objective, unlike document U.S. Pat. No. 7,624, 910 B2, is to propose a bump that does not require welding/friction blending in order to ensure good shearing resistance.

Additionally, the bump according to the invention is not limited to metal-on-metal assemblies.

To this end, the invention first proposes a method for attaching a first part and a second part of a mechanical assembly to one another, wherein the method comprises spraying a powder of a ductile material on the first part and the second part, causing the first part and the second part to become attached to each other by the agglomeration of the powder, wherein the method comprises texturing at least one surface of the first part or second part on which the powder is subsequently sprayed.

Such a method increases the strength of the assembly of the two parts whilst improving the attachment of the agglomerated powder to them.

Various additional characteristics may be provided, alone or in combination:

the texturing comprises producing a network of holes by a succession of several impacts of a laser beam in a single place followed by moving the laser beam, wherein the network is produced as a function of the spraying of the powder, such that a density of the holes or lines of the network by unit of area is greater than:

$$\frac{e}{Stpa \times L}$$

wherein:
(e) is a thickness of the agglomerated powder in a direction perpendicular to the surface of the first part or second part;
Stpa is the section of the holes or lines of the network;
L is a length of the agglomerated powder in a direction parallel to the direction of a traction force between the first and the second part;
the material of the first and/or second part has a mechanical strength that is greater than or equal to the mechanical strength of the powder;
the first and second parts are made of an aluminium alloy having a mechanical resistance between 150 and mPa or of steel having a mechanical resistance between 600 and 2000 mPa, and the powder is made of aluminium or an aluminium alloy having a mechanical resistance between 100 and 400 mPa;
the method comprises, following the spraying, the application of a shearing and/or traction force to the mechanical assembly between the first and second part;
the shearing force applied is greater than 1000±100N;
the method comprises, prior to the spraying, positioning the first part and the second part relative to one another and temporarily blocking the first and second part thus positioned;
the spraying is cold spraying;
the spraying is carried out with air at a pressure of 29 bar±10% and at a temperature of 320° C.±10%;
the texturing is carried out on a surface of the first part and a surface of the second part, thus allowing the strength of the assembly of two pieces next to one another to be increased;
the surface of the first part and the surface of the second part are arranged in a coplanar fashion, with the two parts being next to one another;
the parts are arranged at least partially on top of one another, with the spraying immobilising one of the parts on the other;
the spraying is carried out in a transverse opening of the immobilized part, wherein the opening has a transverse dimension that decreases in the direction of the other part;
the texturing is carried out by means of a laser beam;
the laser beam comprises several successive impacts in a single place, followed by movement, forming a network of holes texturing the at least one surface, or in that the laser beam comprises a continuous impact whilst moving, forming a network of lines texturing the at least one surface;
the first and/or second part is made of an aluminium alloy or steel, and the holes or lines of the part are respectively produced at a distance of 150 or 200 µm±10% from one another, so that the breakage of the assembly occurs at the level of the agglomerated powder rather than its anchors (micrometric protrusions) on the parts;
the production of the network gives each hole a contour within a circle having a diameter less than or equal to its depth, or gives each line a contour within a rectangle having a width less than or equal to its depth;
the spraying comprises several passes.

The parameters of the cold spraying process are adjusted using the knowledge of persons skilled in the art so as to form a dense, mechanically strong agglomeration.

Secondly, the invention proposes an assembly comprising a first part, a second part, and an agglomerated powder of a ductile material attaching the parts to one another, wherein the assembly is characterised in that at least one surface of the two parts to which the powder is attached is textured.

Such an assembly has increased strength, thus improving the attachment of the agglomeration to the two parts.

In one variant, 10%±10 percentage points of the agglomerated powder is melted.

Thirdly, the invention proposes a land or air vehicle comprising an assembly as described above.

BRIEF DESCRIPTION OF THE DRAWINGS

The invention will be better understood, and other objectives, characteristics, details, and benefits thereof will be more readily apparent, from the following detailed description, provided by reference to the attached drawings, which are provided by way of example only, and illustrate various embodiments of the invention, and show:

FIGS. 15A-15D are schematic side cutaway views of texturing according to six different embodiments.

DESCRIPTION OF EMBODIMENTS

Figure 1:
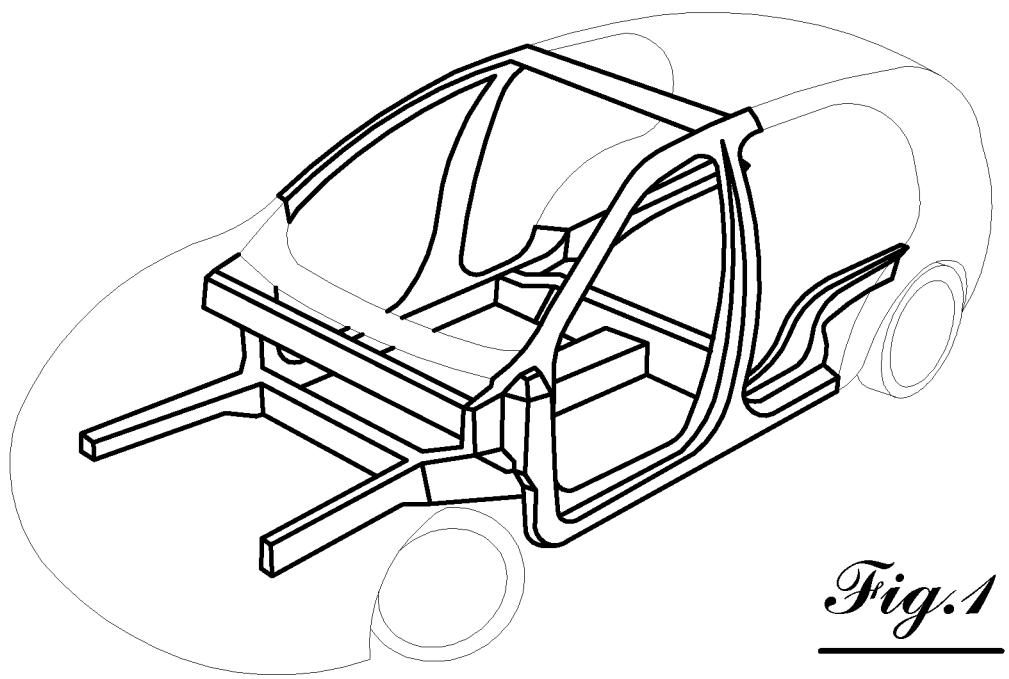
FIG. 1 shows an example of areas of a vehicle produced with UHS steels.
Figure 2A:
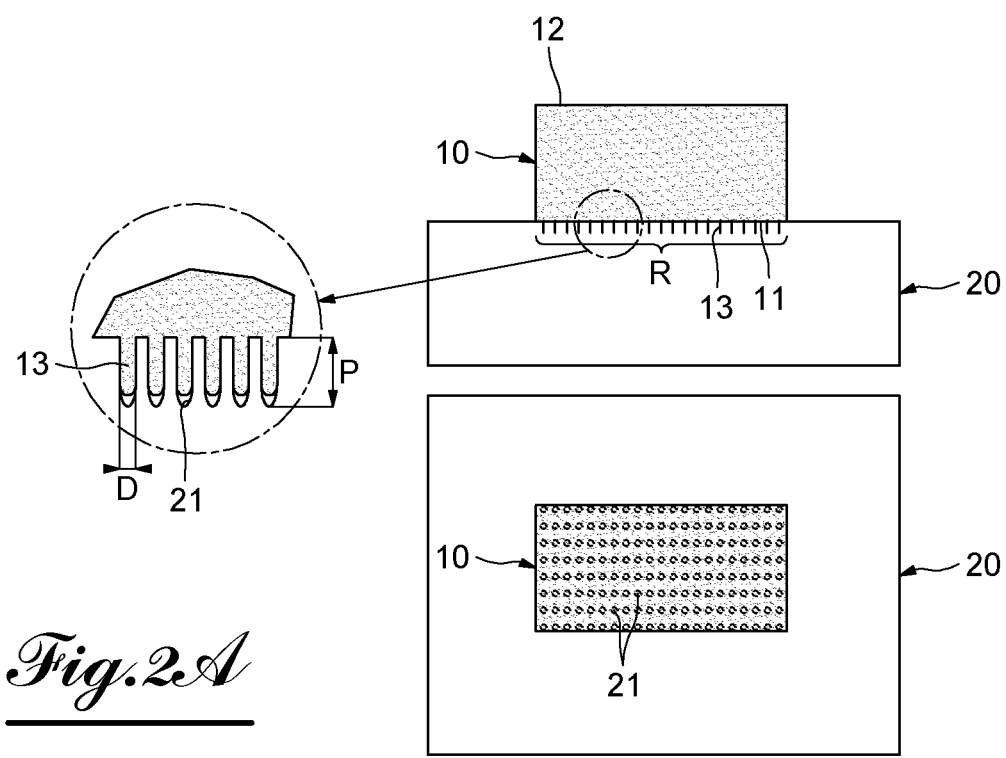
FIGS. 2A and 2B are schematic views of a 3-dimensional bump according to two different embodiments.
Figure 2B:
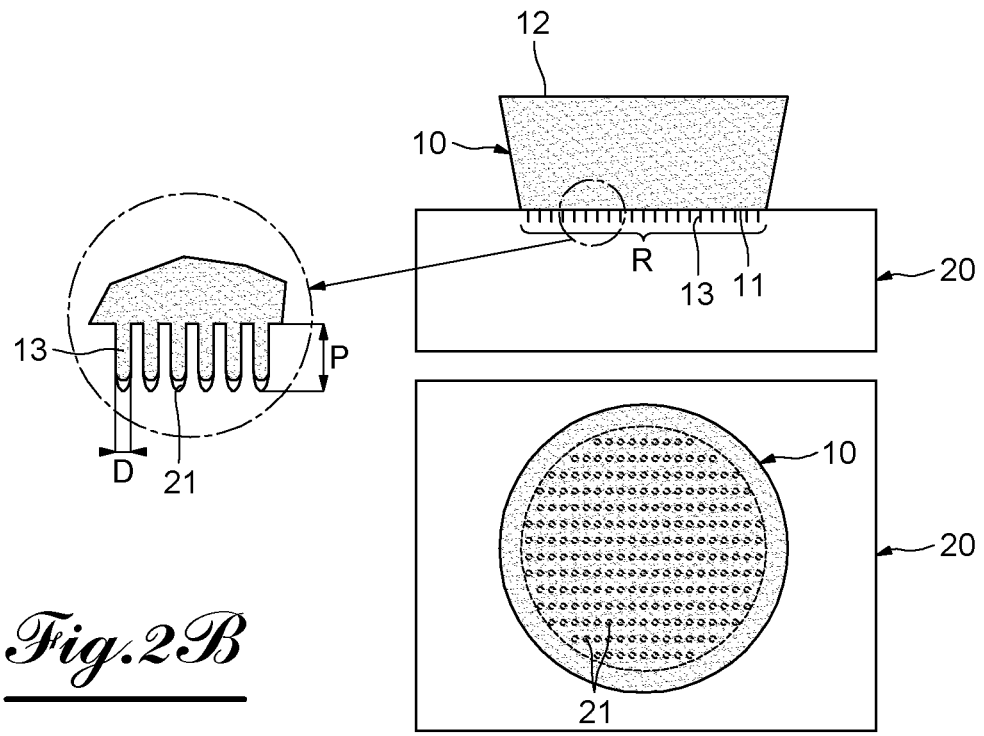

FIGS. 2A and 2B are schematic representations of a 3-dimensional metal bump 10. According to one embodiment, the density of the bump 10 is less than or equal to 5.1 g/cm$^3$. The bump 10 comprises a contact surface 11 with a part 20, which may be metal, polymer, or fibreglass/carbon-fibre composite. The bump 10 further comprises an outer surface 12, the surface area of which, in the embodiments shown, is greater than or equal to that of the contact surface 11. The contours of the surfaces 11 and 12 define the outer geometry of the bump 10, which may be, e.g., parallelepiped or frustoconical, without limitation as to the shape.

The bump 10 is an agglomeration of powder obtained by additive manufacturing by cold spraying metal particles.

At least one part of the contact surface 11 with the part 20, the bump 10 has a network R of micrometric protrusions 13 obtained by completely or partially filling the same network R of micrometric holes or lines 21, which, in one embodiment, are previously made in situ by ablation/sublimation of the material of the part 20.

In one embodiment, the network R of holes or lines 21 of the part 20 is produced using a laser beam.

In various embodiments, the network R of holes or lines 21 of the part 20 is produced by machining (e.g. piercing) the part 20, stamping, or during the manufacturing of the part 20, e.g. when it is being cast.

In one embodiment, the holes or lines 21 are produced in situ and in advance in the support by laser ablation.

The micrometric holes or lines 21 may be distributed periodically or irregularly, and a continuous succession of lines may form a network of lines having a length n.L_t, (n∈R), that are, e.g., parallel or intersecting, without any limitation as to the specific pattern, as shown in FIGS. 14A-14F. The contour of the holes or lines may, respectively, be included within a circle having a diameter ⊃ or a rectangle having a width D and a length $L_t$. In the embodiments shown, the holes or lines 21 have a mean depth P greater than or equal to D, and are separated by a mean distance that is at least twice D, so as to provide the bump 10 with a purely mechanical connection with the part 20 having optimised shearing strength in a direction substantially perpendicular to the axis of the protrusions 13 or the holes 21.

In the embodiments shown, in particular in FIGS. 15A-15D, the walls of the holes or lines 21 may have an angle of −45-+45° relative to a direction normal to the outer surface 22 of the part and/or the outer surface 32 of the part 30, so as to reinforce the scuffing resistance of the bump 10 in a direction normal to the outer surface 22 of the part 20 and/or the outer surface 32 of the part 30.

In one embodiment, all of the holes or lines 21 of a single network have a similar orientation in order to facilitate their filling by cold spraying, the source of which has an orientation corresponding to that of the walls of the holes or lines 21.

In embodiments that are not shown, the parts 20 and/or 30 have both texturing that comprises holes and texturing that comprises lines.

In certain embodiments, the parts 20 and 30 have different texturing.

In one embodiment, the wall 33 of the end of the part 30 has holes or lines 21. These holes or lines 21 may be inclined in an orientation identical to at least one of the other networks R1, R2 of holes or lines 21.

The bump 10 provides optimised resistance to the propagation of any cracks at the level of the point of attachment of the assembly, with each protrusion 13 of the bump 10 acting individually as a point of attachment.

The total filling of the holes is promoted by the support 20 having a mechanical strength greater than or equivalent to that of the bump 10. In this case, the accumulation of cold sprayed metal particles in the holes or lines 21 during the additive manufacturing of the bump 10 generates a radial force perpendicular to the growth axis of the protrusions 13 and orientated in the direction of the walls of the holes or lines 21, thus ensuring good mechanical anchoring of the bump 10 in the part 20.

In the embodiments shown, the bump 10, which has a purely mechanical (anchoring) connection to a support part 20, may advantageously be used to produce a mechanical point of attachment with optimised shearing resistance between two parts 20 and 30, the chemical composition of which may be different.

Figure 3:
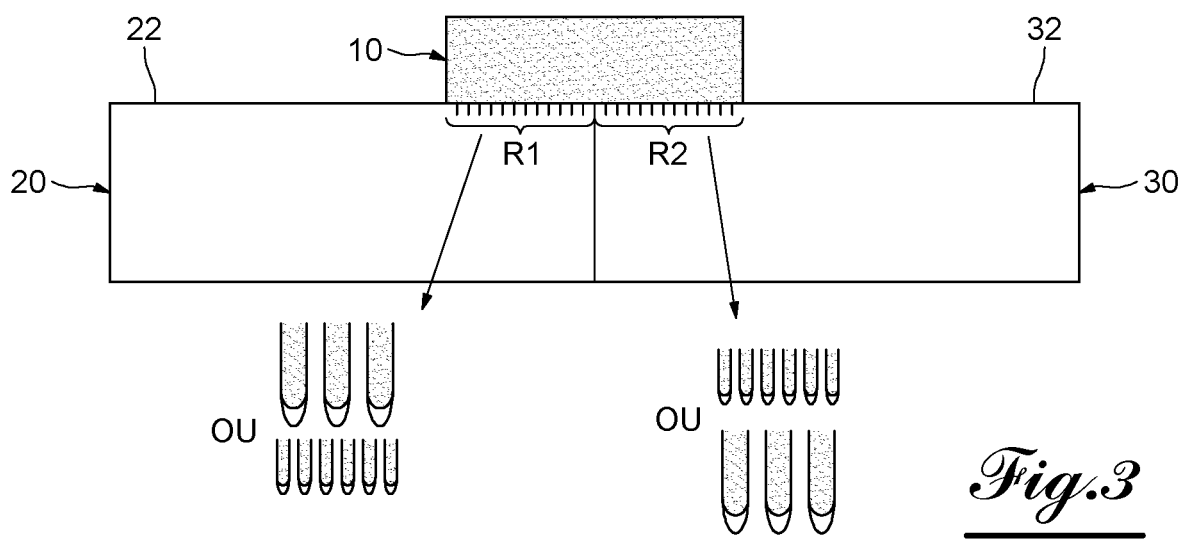
FIG. 3 is a schematic view of an assembly of two parts by means of a bump according to one embodiment.

As shown in FIG. 3, in the absence of preexistent holes in the part 20 or the part 30, the bump 10 may be produced simultaneously on both parts 20 and 30, which respectively have two networks of holes or lines R1 and R2, the cross section, depth, and distribution of which may differ, and are in end-to-end contact with their two outer surfaces 22 and 32 at the same level, so as to obtain a non-detachable, shear- and scuffing-resistant assembly.

In one embodiment, the bump 10 is obtained by positioning the first part 20 and the second part 30 relative to one another and temporarily blocking the first part 20 and the second part 30 thus positioned, followed by spraying the powder. The temporary blocking is removed following the spraying.

Figure 4A:
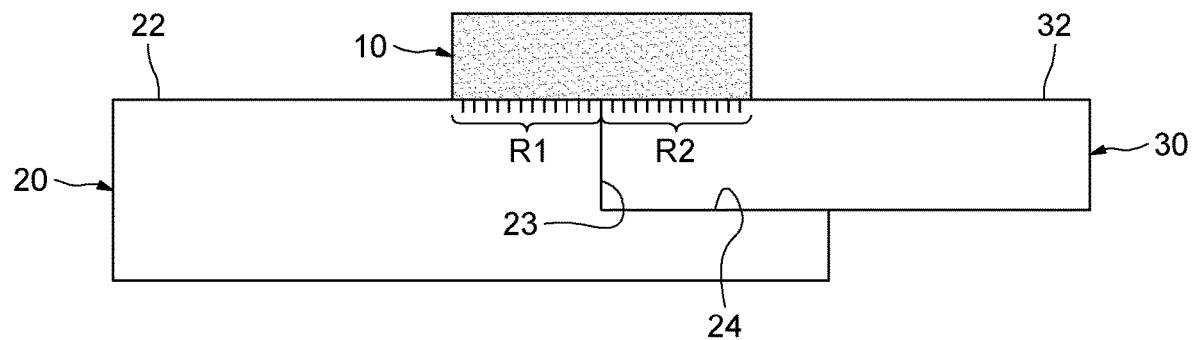
FIGS. 4A and 4B are schematic views of an assembly of two parts by means of a bump according to various embodiments.

To provide the assembly between the parts 20 and 30 with optimised flexural resistance, as shown in FIG. 4A, the part 20 may advantageously have a notch on part of its end and part of its thickness so as to form a support surface 24 as well as a wall 23 perpendicular to the support surface 24. Thus, all or part of the end of the part 30 may be held against the surface 24 and the wall 23.

Figure 4B:
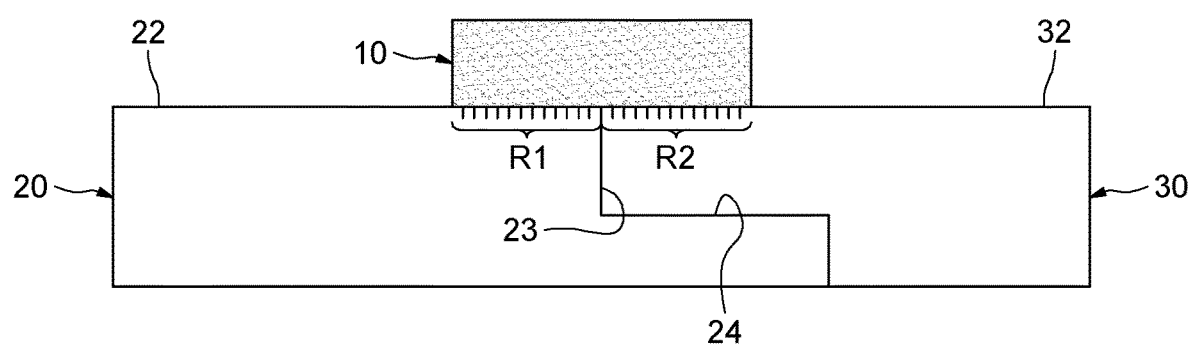

Likewise, as shown in FIG. 4B, the two parts 20 and 30 may each have a notch such that each part 20, 30 rests on the other part 20, 30.

Figure 5:
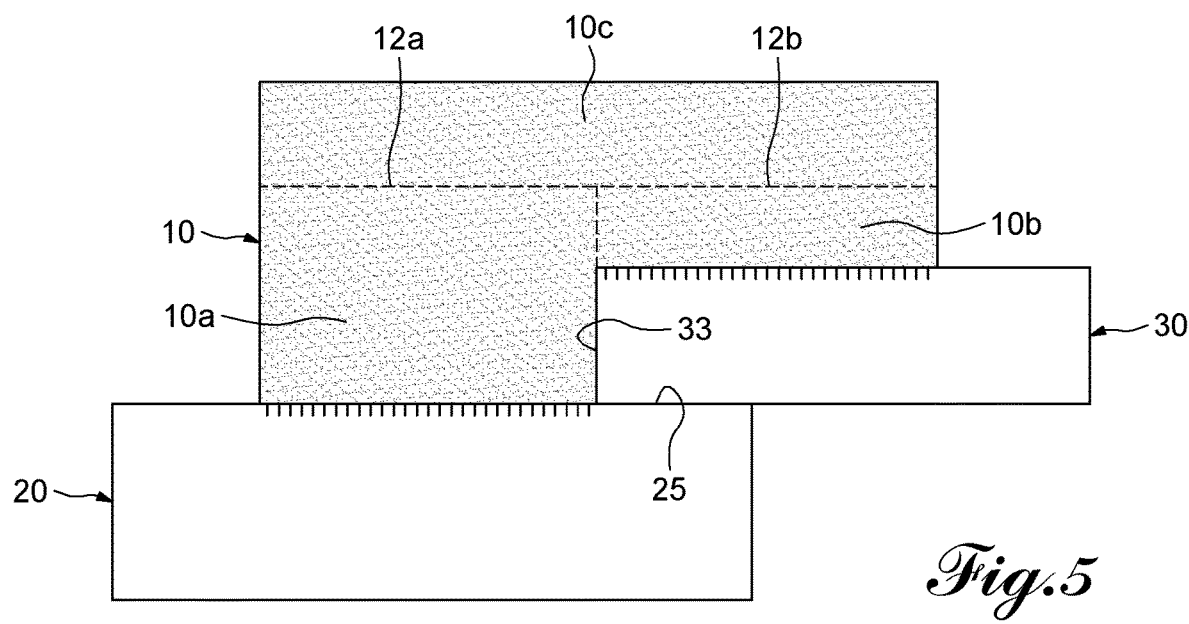
FIG. 5 is a schematic view of an assembly of two parts by means of a bump according to another embodiment.

As shown in FIG. 5, in the absence of preexisting punctures in the part 20 or the part 30, the metal bump 10 may be used to produce a second type of assembly between two parts 20 and 30 when the part 30 partially covers the part 20 and is held against a support surface 25.

A first bump 10a is produced on the part 20 with a growth limitation by additive manufacture on the wall 33 of the end of the part 30. The first bump 10a has a thickness greater than that of the part 30 or the part of the part 30 that abuts the surface 25.

A second bump 10b, having the same chemical composition as the first bump 10a, is produced on the part 30 with a thickness such that the outer surface 12b of the second bump 10b is on the same level as the outer surface 12a of the first bump 10a.

Lastly, a volume of material 10c, having the same chemical composition as the bumps 10a and 10b, is produced by cold spraying on the outer surfaces 12a and 12b so as to mechanically assemble the two bumps 10 and 10b and thus mechanically assemble the parts 20 and 30.

In one embodiment, the steps of producing the bumps 10a and 10b and the volume of material 10c are carried out in a single additive manufacturing operation by means of cold spraying and form a single unit 10.

Figure 6:
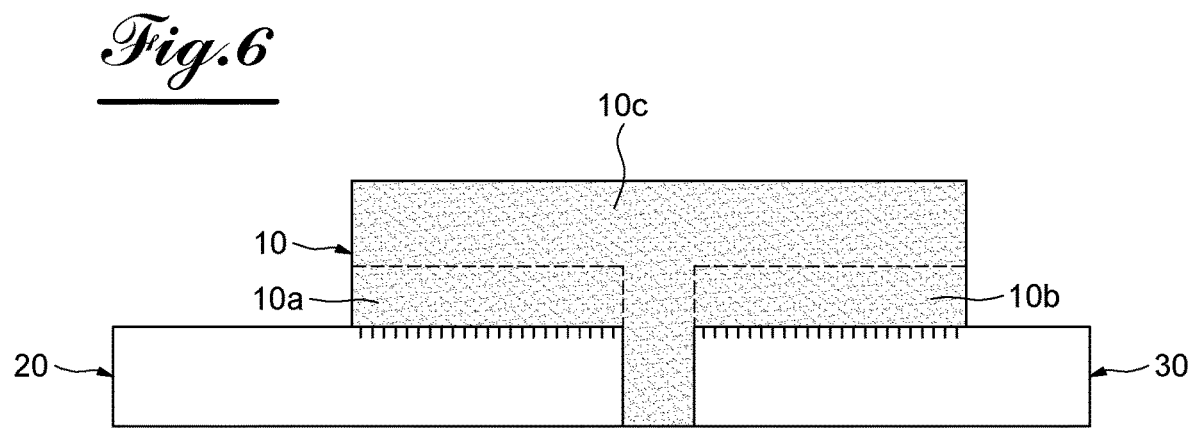
FIG. 6 is a schematic view of an assembly of two parts by means of a bump according to another embodiment.

In the specific case in which the parts to be assembled 20 and 30 are not contiguous on two of their ends and do not have a coverage, the volume of material 10c obtained by cold spraying may have a specific geometry (T-shaped with a cutaway view) as shown in FIG. 6, so as to fill the space between the parts 20 and 30.

In one embodiment, the steps of producing the bumps 10a and 10b and the volume of material 10c may be carried out in a single additive manufacturing operation by means of cold spraying and form a single unit 10.

The production of a bump 10 comprising three parts 10a, 10b, and 10c, or two bumps 10a and 10b and a volume of material 10c that are connected, when the parts 20 and 30 are not contiguous, as shown in FIG. 6, solves the problem of failure to deposit the aluminium powder when it is cold-sprayed on the non-contiguous parts 20 and 30 without first filling the space between the parts 20 and 30 by a volume of material 10c.

Figure 7:
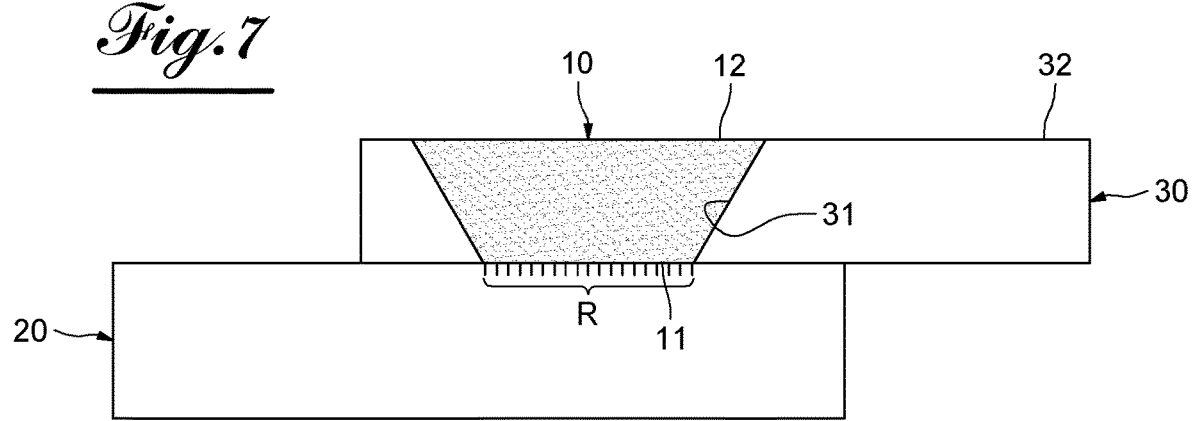
FIG. 7 is a schematic view of an assembly of two parts by means of a bump according to another embodiment.

As shown in FIG. 7, and taking into account the outer shape of the bump 10, which may be frustoconical, with the surface 12 having a surface area greater than that of the contact surface 11 with the part 20, the bump 10 may be produced after a part 30, having a frustoconical hole with a volume slightly greater than that of the future bump 10 has been connected with partial coverage on the part 20.

In this case, the bump 10 is mechanically anchored on the part 20 by means of the network R of holes or lines and the protrusions 13, and continues growing by means of additive manufacturing by cold spraying on the outer wall 31 of the frustoconical hole in the part 30.

In the specific case in which one part of the assembly 30 is pre-perforated, and in the embodiment shown, the bump 10 does not go beyond the outer surface 32 of the part 30, which may be advantageous in order to avoid excess bulk in the mechanical assembly produced between the parts 20 and 30.

In various embodiments, the hole in the part 30 has any shape, and widens towards one part of the hole, such that the part 30 is held in place by the bump 10, with the bump 10 at least partially filling the hole.

For all examples illustrated above, the network(s) R of holes or lines of the parts 20 and/or 30 are, in one embodiment, obtained by means of a laser beam characterised by a power PL and a frequency F. In some embodiments, the depth P of the holes or lines of the network(s) R is greater than or equal to the mean diameter or width D of the holes or lines, such that the P/D ratio is always greater than 1.

The P/D ratio is controlled by the focus and diameter of the laser beam and the number N of laser impacts in the same place, or the linear speed of the movement of the laser for a given power PL and frequency F. For a given material, it is commonly accepted that, the greater the power and number of impacts and/or the lower the linear speed of movement is for a given frequency, the deeper the hole or line within a certain limit corresponding to the possibility of vaporisation and extraction of the material subjected to laser irradiation of the hole being formed. Furthermore, the greater the laser frequency for a given power, number of impacts, and/or linear speed of movement of the laser, the less the depth of the hole.

Figure 8:
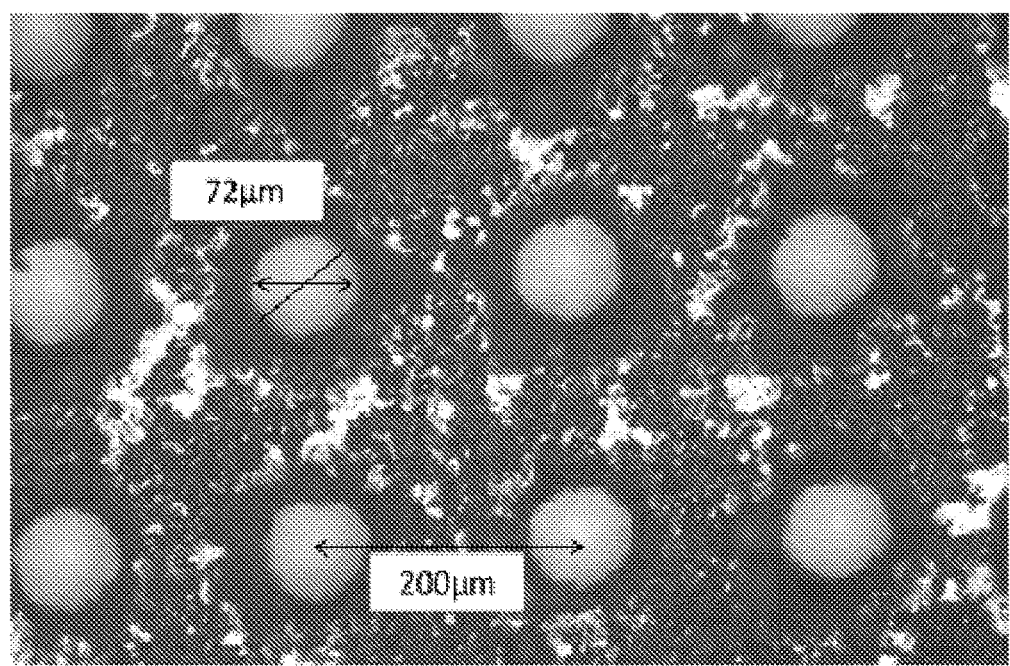
FIG. 8 is an optical micrograph of a network R of holes in one of the parts being assembled.

For example, FIG. 8 shows a network R of holes having a P/D ratio approximately equal to 2.7, obtained on laboratory scale by a 20 W±10% laser with a frequency of 20 kHz±10% on a steel surface having a mechanical strength of 900 MPa. In this particular case, the holes are spaced apart by app. 200 µm and have a mean diameter close to 70-75 µm.

In the conditions of FIG. 8, a single hole is obtained following 90 consecutive laser impacts over $4.5 \times 10^{-3}$ s. For example, for a bump 10 having a length, width, and thickness of 20, 10, and 2 mm respectively, 10-20 holes-protrusions/mm$^2$ are generally needed in order to ensure that the future assembly has optimal mechanical strength. For this bump with a support surface of 200 mm$^2$, produced on a steel surface having a mechanical strength of 900 MPa, the aforementioned laser conditions result in a laser preparation ftime of app. 9-18 s on laboratory scale.

Taking into account a mass flow of sprayed material of 1-3 kg/h on laboratory scale or in industrial conditions, respectively, the bump 10, which is, e.g., primarily aluminium-based, having a density of app. 2.7 g/cm$^{-3}$ and a volume of 0.4 cm$^3$, has a mass close to 1.1 g, and may theoretically be produced in only 0.3 or 0.1 s. Thus, the manufacturing time is essentially limited by the movement of the robot arm to produce the bump 10 in several passes, with a material flow rate adjusted in order to produce the bump with the desired geometry. In these conditions, the cold spraying time to produce a bump 10 with a volume of 0.4 cm3 is generally between 2 and 3 s.

In a different embodiment, on an industrial scale, each hole is obtained following 9 impacts with a 200 W±10% laser. In these optimal conditions, the laser preparation time is reduced to between 0.9 and 1.8 s. Thus, with industrial parameters, a bump 10 that is solidly anchored in a steel support with a mechanical strength of 900 MPa may be produced in a time of between 2.9 and 4.8 s, which is compatible with applications in the automotive or aeronautic fields.

Figure 9:
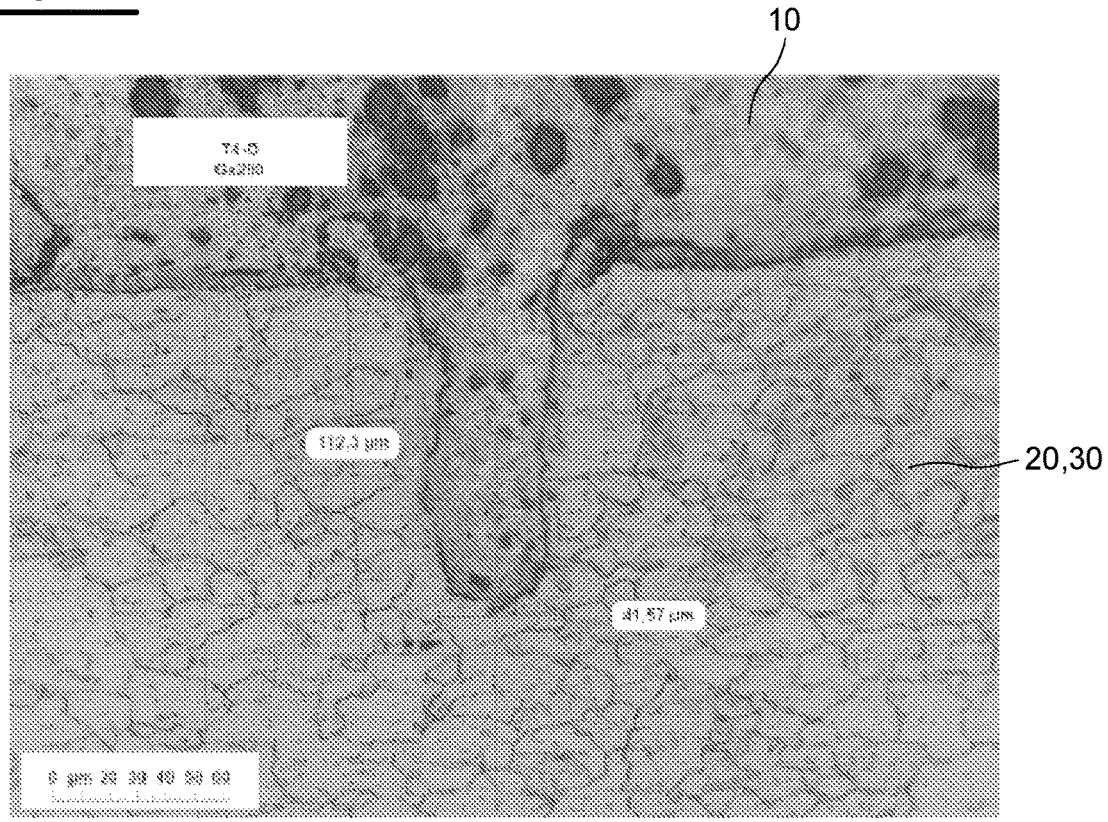
FIG. 9 is an optical micrograph of a hole in one of the parts being assembled, which is filled by a protrusion of a bump according to one embodiment.

FIG. 9 shows the example of filling a hole obtained by a laser (P/D of 2.7) on a steel plate with a mechanical strength of 900 MPa with cold-sprayed aluminium.

Figure 10:
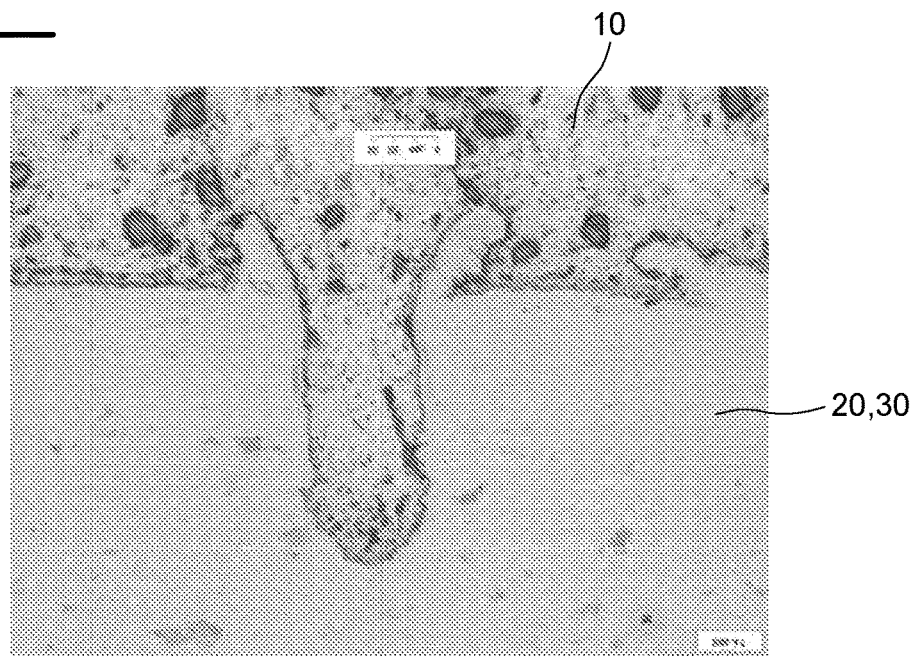
FIG. 10 is a view similar to FIG. 9 according to another embodiment.

FIG. 10 shows a positive point of the laser texturing of the steel. Each hole is produced by several laser impacts at constant power, forming a protrusion of the steel around the hole by local melting of the steel, and evacuation by the local pressure exerted upon impact and the solidification of the steel.

This protrusion constitutes an additional anchoring effect for the bump 10 obtained by cold spraying.

FIGS. 8, 9, and 10 provide perfect illustrations of the possibility of producing a bump with a multitude of micrometric protrusions as well as very good filling of the holes by the sprayed aluminium, which is more ductile than steel. In these manufacturing conditions, the aluminium bump 10, having a mechanical strength of 100 MPa, a thickness of 2 mm, and a contact surface area of 200 mm$^2$, on a steel plate having a mechanical strength of 900 MPa, has a shearing strength on the order of 2000 N, or app. 200 kg per bump.

In one embodiment, the bump 10 mostly consists of aluminium and may contain the elements silicon (Si), manganese (Mn), and/or magnesium (Mg) so as to have increased mechanical properties, generally between 200 and 400 MPa based on the contents of the alloy elements. In these conditions, an aluminium bump 10, having a thickness of 2 mm, and a contact surface area of 200 mm$^2$, on a steel plate having a mechanical strength of 900 MPa, has a shearing strength on the order of 8000N, or app. 400-800 kg per bump.

In certain specific applications (e.g., aeronautics), the bump 10 may consist mostly of titanium, and may contain the elements aluminium or vanadium. In the specific case of a bump 10 made of Ti-6Al-4V (TA6V) having a mechanical strength of 1100 MPa for a mechanical assembly between an UHS steel plate and a titanium alloy plate, the bump 10, with a thickness of 2 mm and a contact surface area of 200 mm² with the steel plate, has a shearing strength of 22,000 N, i.e. 2.2 t per bump.

The various aforementioned examples, with a surface texturing allowing for the production of networks of holes R1 and R2, are totally applicable to cases in which the networks R1 and R2 consist of lines.

In various embodiments, the part 20 is made of metal, polymer, and/or composite. The part 30 is made of metal, polymer, and/or composite.

In order to increase the strength of the assembly, the material used for the sprayed powder has a mechanical strength less than or equal to the mechanical strength of the material of the support part(s) 20, 30.

In one embodiment, during spraying on the textured steel, the powder with a lower mechanical strength deforms plastically and accumulates in the holes or lines formed, e.g. by laser, and generates conditions favourable to the mechanical strength of the assembly.

In one embodiment, two cases may occur when spraying onto the textured aluminium alloy:
the powder has a lower mechanical strength than that of the aluminium alloy, and the same effect as with the textured steel is observed;
the powder has a mechanical strength equivalent to that of the aluminium alloy, and the texturing is partially or totally deformed during spraying, e.g., cold spraying, resulting in 'blending' of the two aluminium alloys with very good mechanical strength.

In the latter case, the texturing of the aluminium alloy part 30 is no longer visible after spraying. Microscopic examination of a cross-section indicates that the aluminium of the powder and the aluminium alloy of the part 30 have mixed.

In one embodiment, if the powder has a mechanical strength greater than that of the part 30 with the lower hardness (aluminium alloy part), the spraying, e.g., cold spraying, will result in abrasion of the 30 part with lower hardness without the powder adhering or bump 10 formation.

Figure 11:
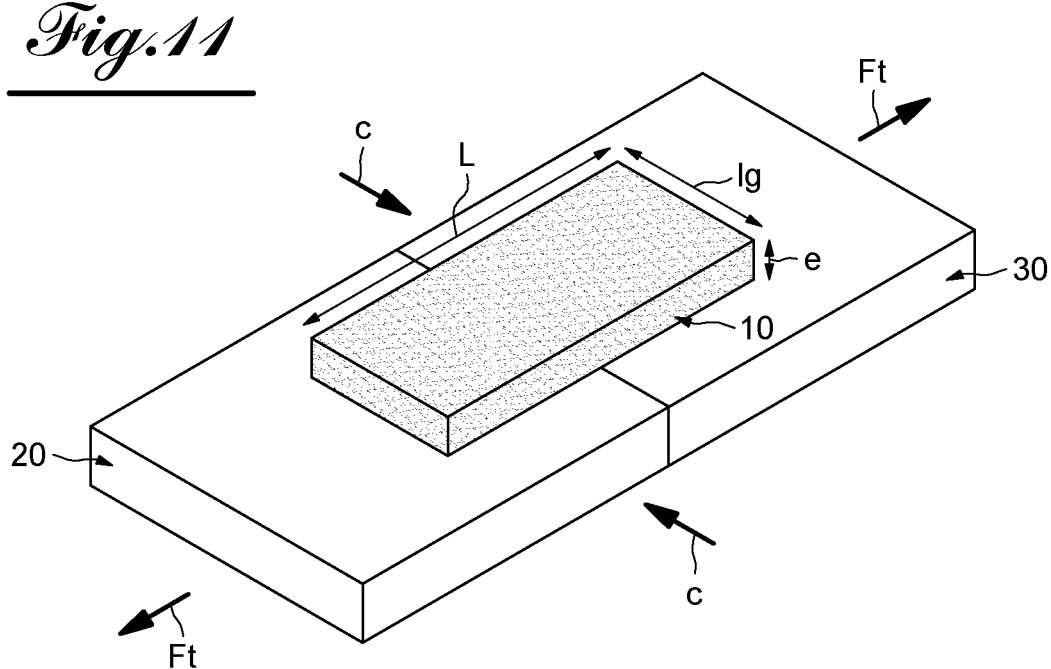
FIG. 11 is a schematic view of an assembly of two parts by means of a bump according to one embodiment.

When the mechanical assembly is subjected to a shearing and/or traction force between the first (20) and second part (30), in one embodiment, it is preferred for the traction and/or shearking break of the bump 10, respectively by a force Ft applied in a direction orthogonal to a plane of intersection of the parts 20 and 30 and/or a force c applied in a direction parallel to the surfaces 22 and 32 of the parts 20 and 30 that are in contact with the bump 10 and parallel to the plane of intersection of the parts 20 and 30 as shown in FIG. 11, occurs at the level of the body of the bump 10 rather than its anchors (micrometric protrusions) on the parts 20 and 30.

To this end, it has been found that the total surface area of the anchors Stpa, having a circular or rectangular cross section, at the level of the surfaces 22 and 32 must be greater than the surface area of a section Ss of the bump 10 in a plane coplanar with the force exerted by the shearing and coplanar with the surfaces 22 and 32.

Thus:

$$\text{Stpa} > \text{Ss} \qquad [\text{Math. 1-1}]$$

$$\text{Spa} \times \text{Npa} > e \times lg \qquad [\text{Math. 1-2}]$$

wherein:
Spa is a mean surface area of an anchor of the bump 10;
Npa is the number of anchors of the bump 10;
e is a thickness of the bump 10 in a direction perpendicular to the shearing force c and perpendicular to the surfaces 22 and 32;
lg is a width of the bump 10 in a direction perpendicular to the shearing force c and parallel to the surfaces 22 and 32;

$$[\text{Stpa}] \times [d_{pa} \times L \times lg] > e \times lg \qquad [\text{Math. 1-3}]$$

wherein:
dpa is a density per unit of surface area of the anchors of the bump 10;
L is a length of the bump 10 in a direction perpendicular to the shearing force c and parallel to the surfaces 22 and 32.

$$d_{pa} > \frac{e}{\text{Stpa} \times L} \qquad [\text{Math. 1-4}]$$

Wherein $$\text{Stpa} = \pi \times \frac{D^2}{4}$$

in the case of an anchor with a circular cross section (network of holes) or Stpa=D.L$_t$ in the case of an anchor with a rectangular cross section (network of lines).

In the example of a bump 10 having a length L of 20 mm, a width lg of 10 mm, and a thickness e of 2 mm, a mean diameter of the anchors with circular cross-sections D of, e.g., 80 μm, and the density of the anchors per square millimetre dpa must be greater than app. 20.

Such a bump, made of aluminium, with a mechanical strength Rm equal to 100 MPa, would resist a tensile stress Ft equal to:

$$F_t = R_m \times e \times lg \qquad [\text{Math. 2-1}]$$

$$F_t = 100 \times 2 \times 10 \qquad [\text{Math. 2-2}]$$

$$F_t = 2000 \text{N} \qquad [\text{Math. 2-3}]$$

In another embodiment, such a bump, made of an aluminium alloy containing Si and Mg, with a mechanical strength Rm equal to 300 MPa, would resist a tensile stress Ft equal to:

$$F_t = R_m \times e \times lg \qquad [\text{Math. 3-1}]$$

$$F_t = 300 \times 2 \times 10 \qquad [\text{Math. 3-2}]$$

$$F_t = 6000 \text{N} \qquad [\text{Math. 3-3}]$$

In the example of a second bump 10 having a length L of 20 mm, a width lg of 10 mm, a thickness e of 2 mm, a mean width and length of the anchors with rectangular cross-sections D of, e.g., 80 μm and 1 mm (less than lg), respectively, the density of the anchors per square millimetre dpa must be greater than app. 1.3.

Trials have been carried out in order to confirm these theoretical statements.

Thus, the parts 20 and 30 are respectively made of steel and aluminium alloy.

In the embodiment described, the part 20 has a mechanical strength of between 600 and 900 MPa. The part 30 has a mechanical strength of between 150 and 200 MPa.

In different embodiments, the aluminium alloy belongs to one of series 3000-6000. For example, the alloy comprises aluminium and magnesium, aluminium, magnesium and silicon, or aluminium, manganese, and silicon.

The parts 20 and 30 are textured by laser pulses at a power of 20 W±10% and a frequency of 20 kHz±10%. 5 pulses per hole are made in the aluminium alloy part. 90 pulses per hole are made in the steel part.

Each plate is textured in an area of 10×10 mm.

The texturing of the aluminium alloy part creates holes having a mean diameter D of 80 μm, spaced apart by 150 μm±10% from one another. The texturing of the steel part results in holes that, in a first embodiment, by 400 μm±10% from one another, or, in a second embodiment, by 200 μm±10%.

The cold spraying to create the bump 10 was carried out with the Kinetic 3000 (CGT GmbH, Germany) cold spraying system with an MOC 24 nozzle.

The cold spraying was carried out with Al 1050 aluminium powder with a grain size between 30 μm and 56 μm. The aluminium powder has a mechanical strength of between 100 and 150 MPa.

In various embodiments, the aluminium powder belongs to the 1000 or the 3000-6000 family.

In this embodiment, approximately 90%±10 percentage points of the grains forming the powder have not melted.

The cold spraying was carried out with air as the carrier gas at a pressure of 29 bar±10%, at a gas temperature of 320° C.±10%. The flow rate of the carrier gas is 80 l/min±10%. The powder tray rotated at 20 rpm±10%. The pitch was 3 mm±10%, the spraying distance 25 mm±10%, and the driving speed 30 mm/s±10%. The spraying was carried out in 3 passes.

Figure 12:
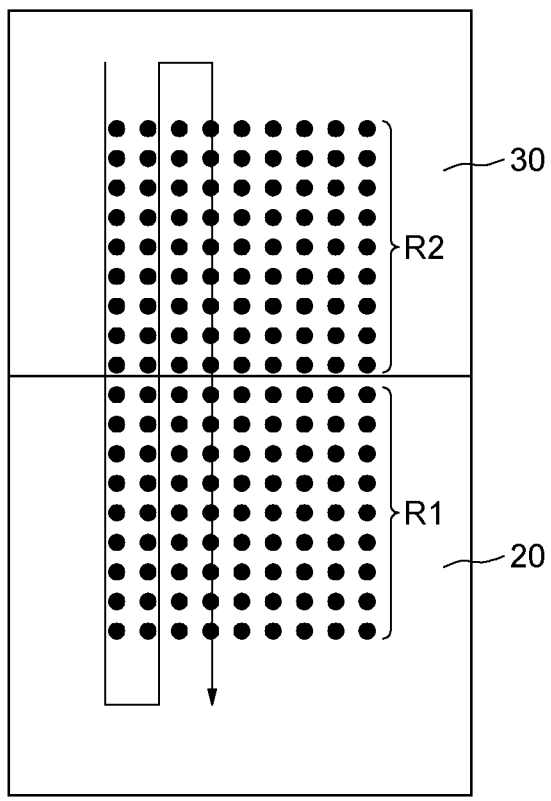
FIG. 12 is a schematic view of two textured parts showing the progression of the cold spraying process.

Cold spraying was carried out in accordance with the progression shown in FIG. 12.

Figure 13A:
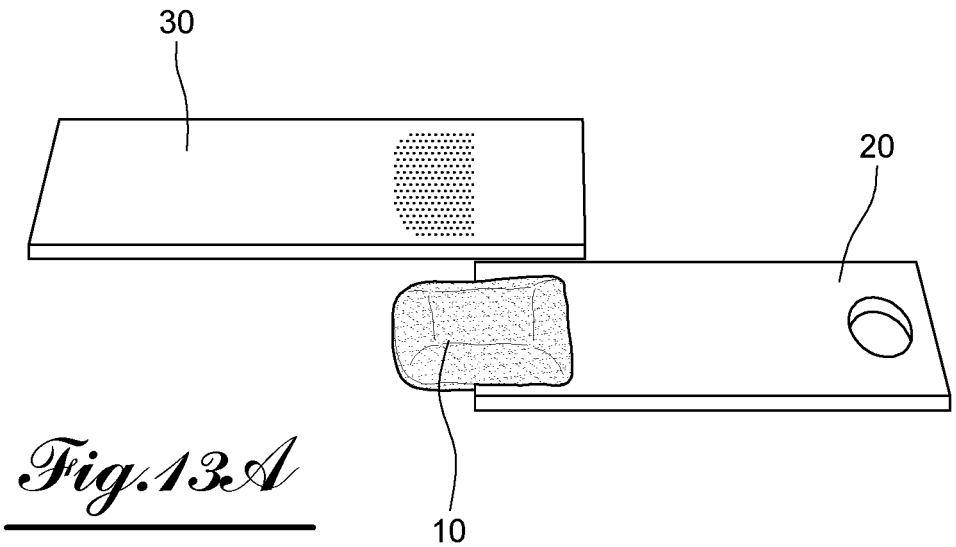
FIGS. 13A and 13B show the results of shearing trials on an assembly of two parts by means of a bump according to two different embodiments.
Figure 13B:
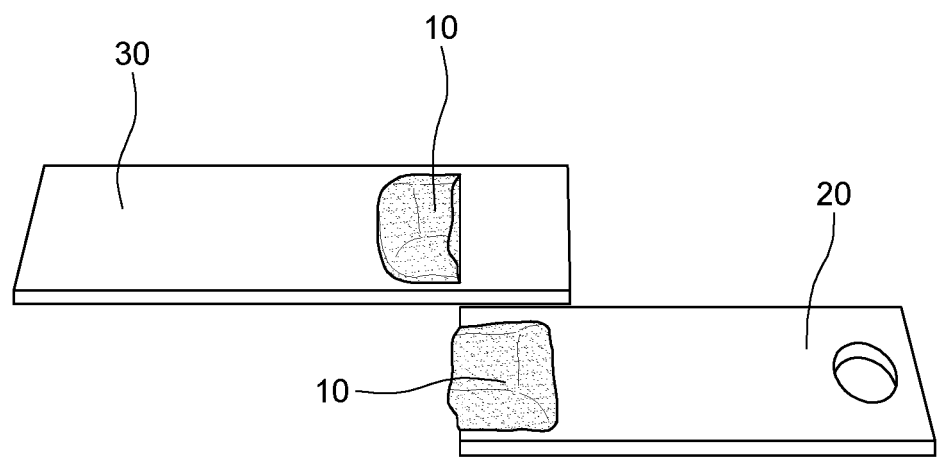
Figure 14A:
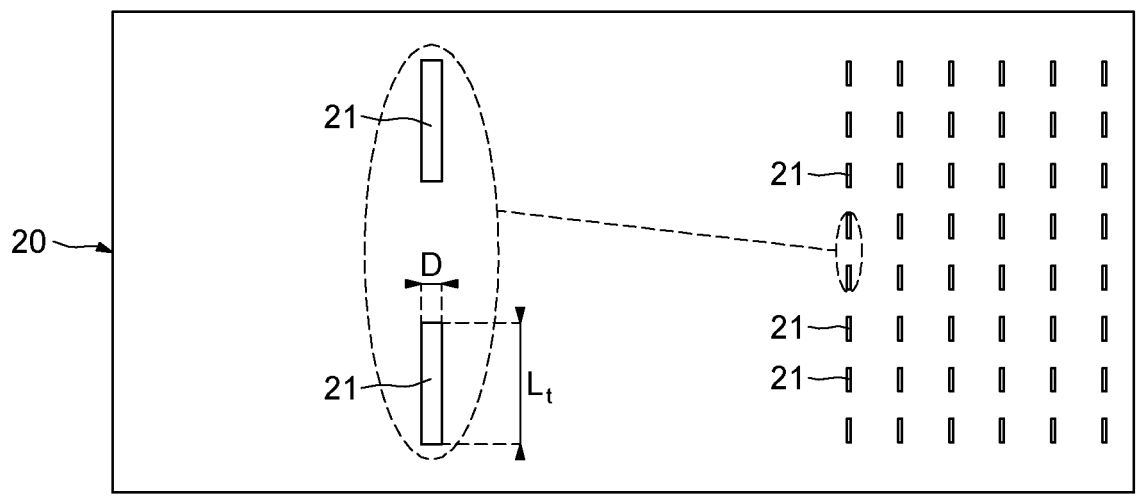
FIGS. 14A-14F are schematic top views of texturing according to six different embodiments.
Figure 14B:
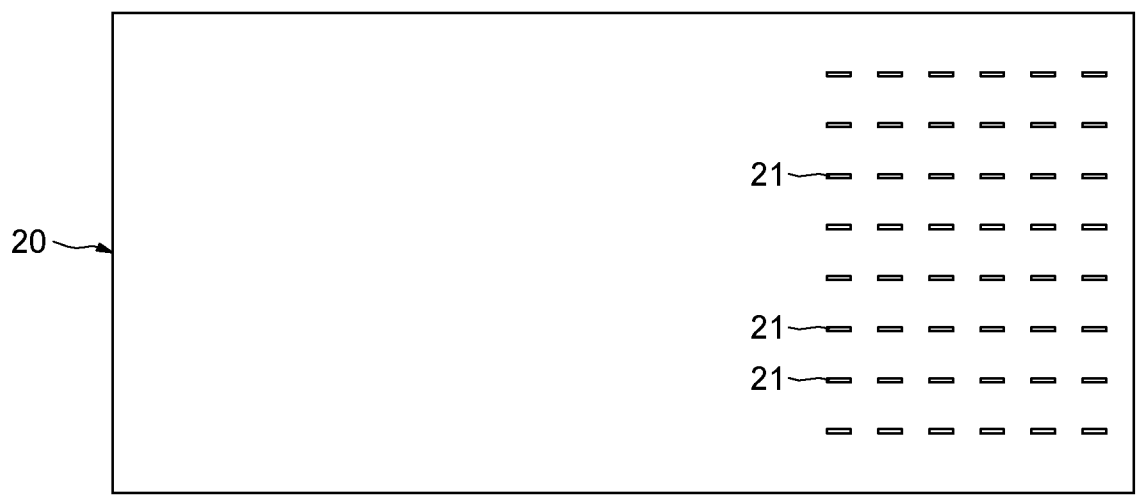
Figure 14C:
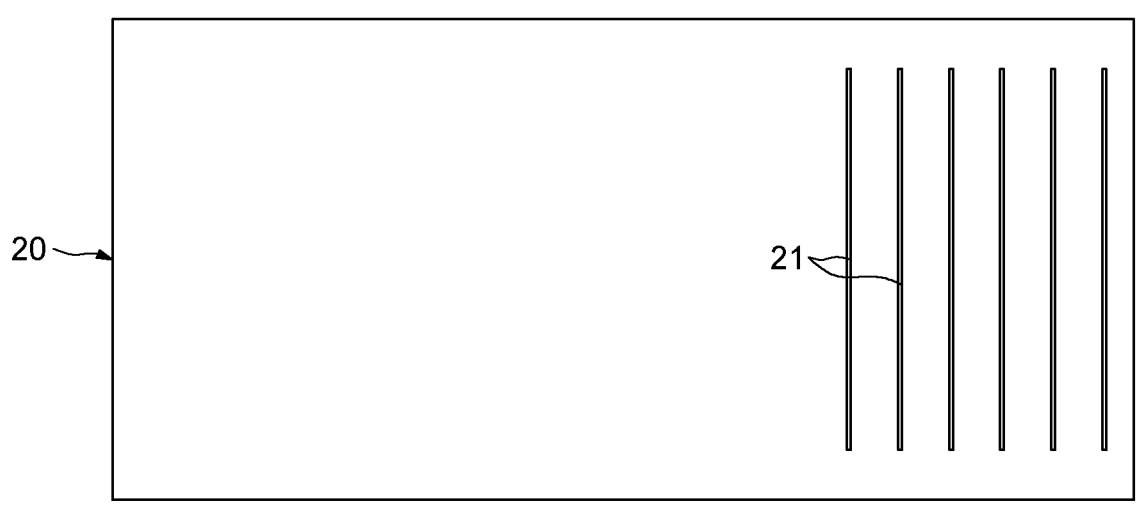
Figure 14D:
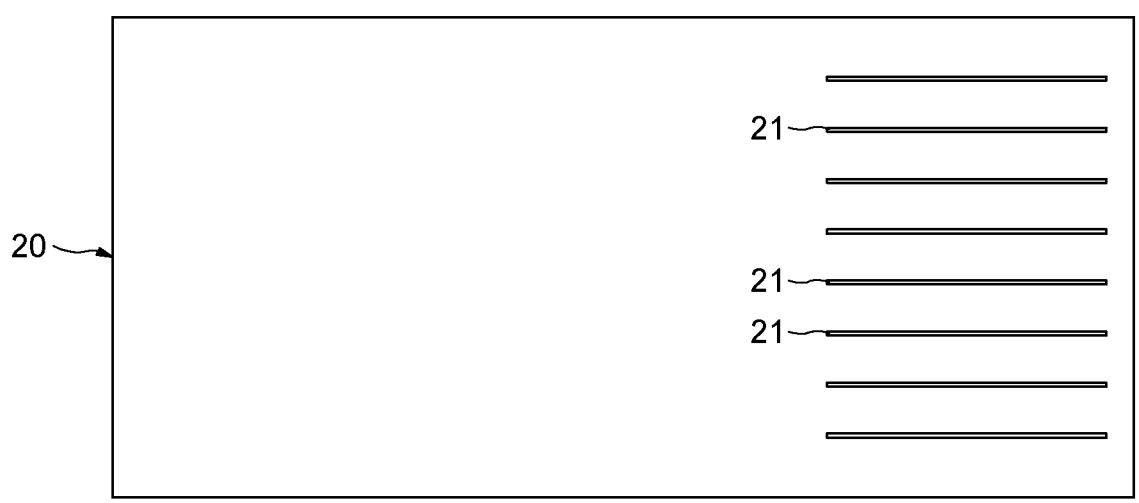
Figure 14E:
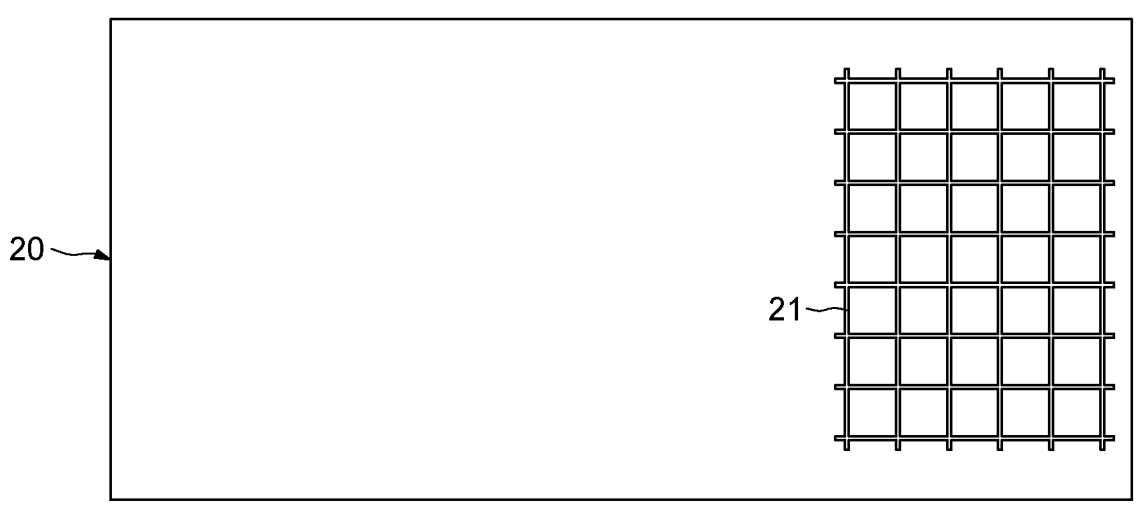
Figure 14F:
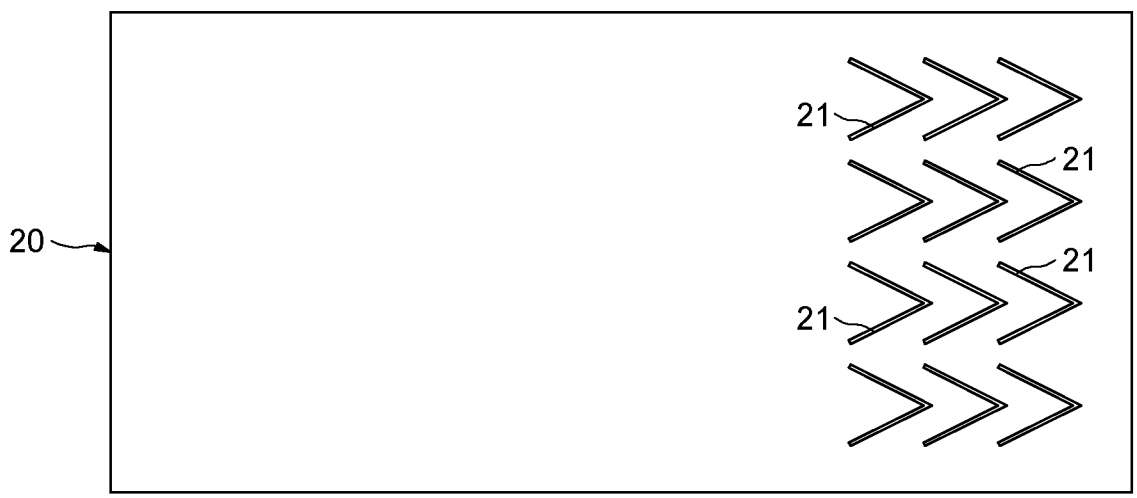
Figure 15C:
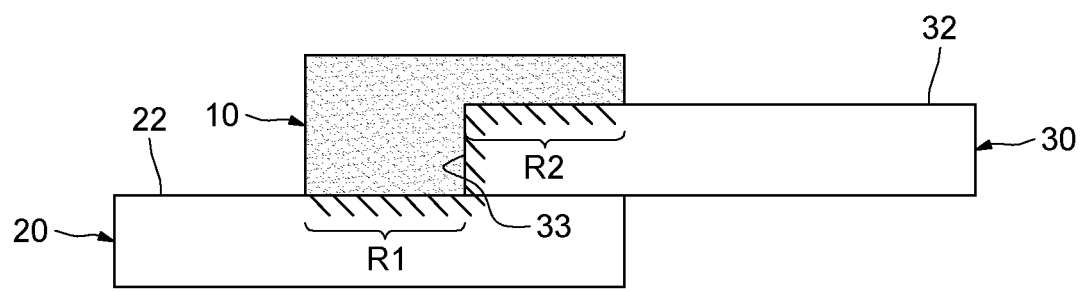
Figure 15D:
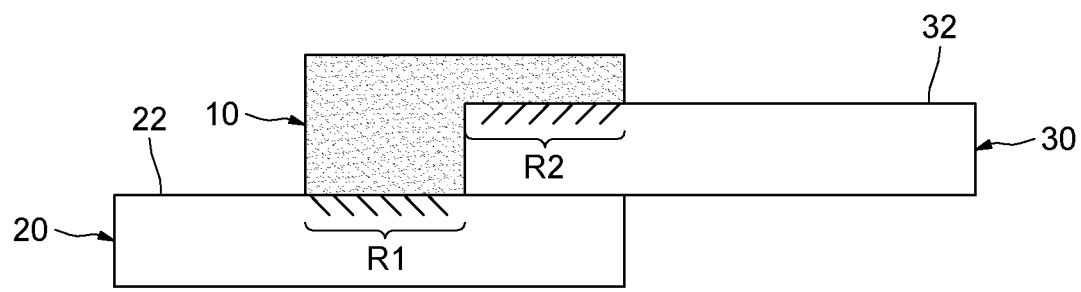

Once the bump 10 has been formed to assemble the parts 20 and 30, traction and shearing stresses as shown in FIG. 11 were applied independently until breaking. FIG. 13A is a schematic representation of the result of a trial carried out on an assembly produced according to the first embodiment, in which the texturing of the steel part created holes spaced apart by 400 μm±10% from one another, following the tensile or shearing stresses. FIG. 13B is a schematic representation of the result of a trial carried out on an assembly produced according to the second embodiment, in which the texturing of the steel part created holes spaced apart by 200 μm±10% from one another, following the tensile or shearing stresses.

It will be noted that, in FIG. 13A, the assembly broke at the level of the junction of the anchors of the bump 10 on the part 30 and the body of the bump 10, with the body remaining intact. In FIG. 13B, the assembly broke at the level of the body of the bump 10, with the anchors of the bump 10 at the level of the parts 20 and 30 remaining connected to the body.

Thus, the tests have shown that, for these parameters for producing the bump 10, a space of 400 μm between the holes was too large for the bump 10 to give way at the level of its body rather than its anchors.

This result coincides with the above calculations, showing that, for a bump 10 with a length L equal to 20 mm, a width lg equal to 10 mm, a thickness e equal to 2 mm, and a mean anchor diameter D equal to 80 μm, the density of the anchors per square millimetre dpa must be greater than app. 20. Thus, the anchors of the bump 10 must be, on average, spaced apart by no more than 220 μm.

Tests were carried out on an aluminium alloy/steel assembly. Prior laser texturing of the steel support part allowed for a network R of holes 50 μm in diameter, 120 μm in depth, and spaced apart by 200 μm over a surface area of 200 mm². For such an assembly, the pullout occurred systematically in the body of the aluminium bump under a stress of 2200±100N.

The bump remains solidly bonded to the support part due to the anchors (micrometric protrusions). This indicates that the tensile stress of the assembly essentially depends on the mechanical strength and geometry of the bump 10, which may be adjusted depending on the desired mechanical strength of the hybrid assembly for an automotive application.

Comparative tests were carried out to assemble an aluminium alloy plate on a steel plate (mechanical strength of 900 MPa) 2 mm in thickness (20 mm coverage) by cold spraying pure aluminium in a hole formed in the aluminium alloy plate. Shearing tests were carried out on several assemblies obtained with different cold spraying parameters to obtain the best connection and the best density possible in the sprayed aluminium. It must be noted that breakage occurs systematically at the interface between the sprayed aluminium and the steel support part, indicating that the assemblies had low shearing strength. In fact, for cold spraying over a surface area of 200 mm2 and a thickness of 2 mm, breakage occurs under a shearing stress of 1000±100 N, which is not satisfactory for an automotive or aerospace application.

The parameters and characteristics of the above examples can be considered independently in order to produce other embodiments.

The invention claimed is:

1. A method for attaching a first part (20) and a second part (30) for mechanical assembly to each other, wherein the method comprises: spraying a powder of a ductile material on the first part (20) and the second part (30), causing the first part (20) and the second part (30) to become attached to each other by agglomeration of the powder, the method being characterized in that (i) it comprises texturing at least one surface of the first part (20) or second part (30) on which the powder is subsequently sprayed and (ii) the texturing comprises producing a network (R1, R2) of holes or lines (21) by means of several successive impacts of a laser beam at a single place, followed by moving the laser beam, wherein the network (R1, R2) is produced as a function of the spraying of the powder, such that a density (dpa) of the holes or lines (21) of the network (R1, R2) by unit of area is greater than:

$$\frac{e}{Stpa \times L}$$

wherein:
 (e) is a thickness of the agglomerated powder (10) in a direction perpendicular to the surface of the first part (20) or second part (30);
 (Stpa) is the section of the holes or lines of the network;
 (L) is a length of the agglomerated powder (10) in a direction parallel to the direction of a traction force (Ft) between the first (20) and the second part (30).

2. The method according to claim 1, characterized in that the material of the first part (20) and/or the material of the second piece (30) has a mechanical resistance greater than or equal to the mechanical resistance of the material of the powder.

3. The method according to claim 1, characterized in that the first and second parts (20, 30) are made of an aluminum alloy having a mechanical resistance between 150 and 400 mPa or of steel having a mechanical resistance between 600 and 2000 mPa, and the powder is made of aluminum or an aluminum alloy having a mechanical resistance between 100 and 400 mPa.

4. The method according to claim 1, characterized in that, following the spraying, it comprises applying a shearing and/or traction force between the first (20) and second part (30) to the mechanical assembly.

5. The method according to claim 4, characterized in that the shearing force applied is greater than 1000±100N.

6. The method according to claim 1, characterized in that, prior to the spraying, it comprises positioning the first part (20) and the second part (30) relative to one another and temporarily blocking the first (20) and second part (30) thus positioned.

7. The method according to claim 1, characterized in that the spraying is cold spraying.

8. The method according to claim 1, characterized in that the spraying is carried out with air at a pressure of 29 bar±10% and at a temperature of 320° C.±10%.

9. The method according to claim 1, characterized in that the texturing is carried out on a surface of the first part (20) and a surface of the second part (30).

10. The method according to claim 9, characterized in that the surface of the first part (20) and the surface of the second part (30) are arranged in a coplanar fashion, wherein the two parts (20, 30) are next to one another.

11. The method according to claim 1, characterized in that the parts (20, 30) are arranged at least partially on top of one another, wherein the spraying immobilizes one of the parts (20, 30) on the other part (20, 30).

12. The method according to claim 11, characterized in that the spraying is carried out in a transverse opening of the immobilized part (20, 30), wherein the opening has a transverse dimension that decreases in the direction of the other part (20, 30).

13. The method according to claim 1, characterized in that the texturing is carried out by means of a laser beam.

14. The method according to claim 13, characterized in that the laser beam comprises several successive impacts in a single place, followed by movement, forming a network (R1, R2) of holes (21) texturing the at least one surface, or in that the laser beam comprises a continuous impact whilst moving, forming a network of lines (21) texturing the at least one surface.

15. The method according to claim 14, characterized in that the first and/or second part (20, 30) is made of an aluminum alloy or steel, and the holes or lines (21) of the part (20, 30) are respectively produced at a distance of 150 or 200 μm±10% from one another.

16. The method according to claim 14, characterized in that the production of the network (R1, R2) gives each hole (21) a contour within a circle having a diameter (D) less than or equal to its depth (P), or gives each line (21) a contour within a rectangle having a width (D) less than or equal to its depth (P).

17. The method according to claim 1, characterized in that the spraying comprises several passes.

18. An assembly of parts of a land or air vehicle comprising a first part (20), a second part (30), and an agglomerated powder of a ductile material attaching the parts (20, 30) to one another, wherein the assembly is characterized in that at least one surface of the two parts (20, 30) to which the powder is attached is textured and the texture comprises a network (R1, R2) of holes or lines (21), wherein the network (R1, R2) is function of the agglomerated powder, such that a density (dpa) of the holes or lines (21) of the network (R1, R2) by unit of area is greater than:

$$\frac{e}{Stpa \times L}$$

wherein:
- (e) is a thickness of the agglomerated powder (10) in a direction perpendicular to the surface of the first part (20) or second part (30);
- (Stpa) is the section of the holes or lines of the network;
- (L) is a length of the agglomerated powder (10) in a direction parallel to the direction of a traction force (Ft) between the first (20) and the second part (30).

19. The assembly according to claim 18, characterized in that 10%±10 percentage points of the agglomerated powder is melted.

* * * * *